Nov. 26, 1968  N. MARFORIO  3,412,700
AMPLITUDE ADJUSTMENT FOR A ZIG-ZAG SEWING MACHINE
Filed Dec. 29, 1965  14 Sheets-Sheet 1

Fig.1a

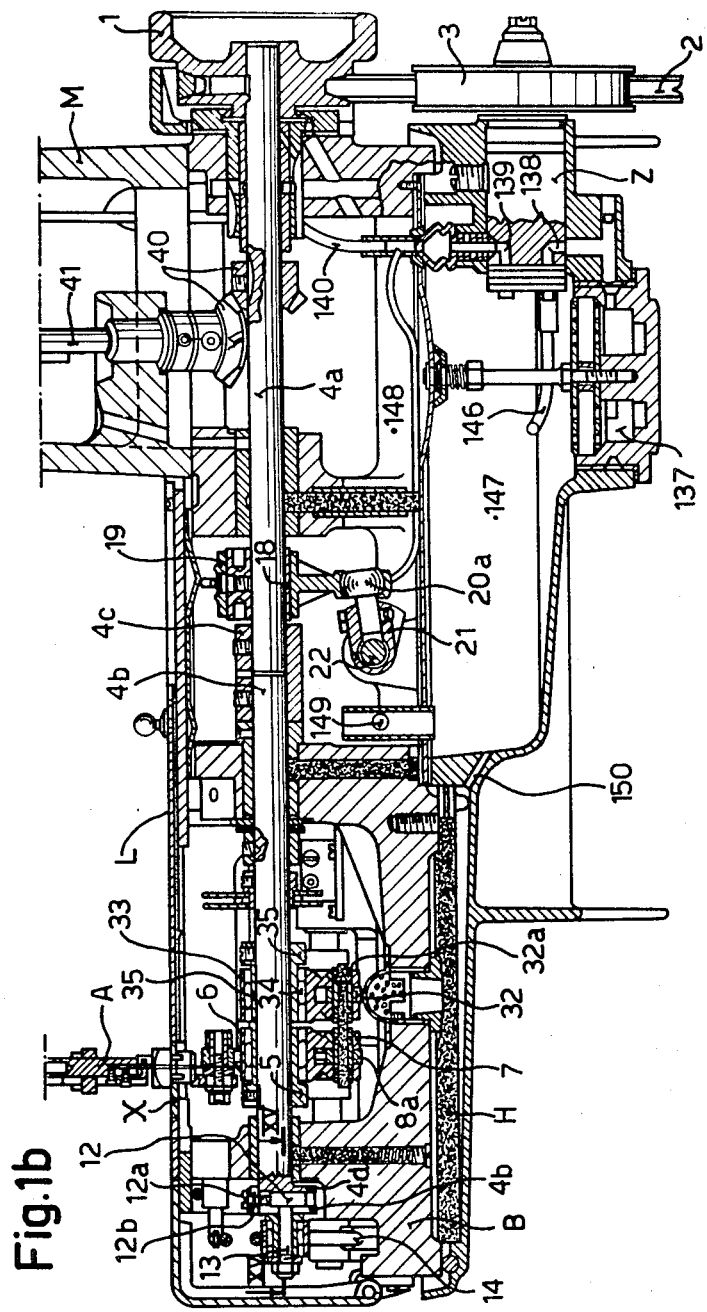

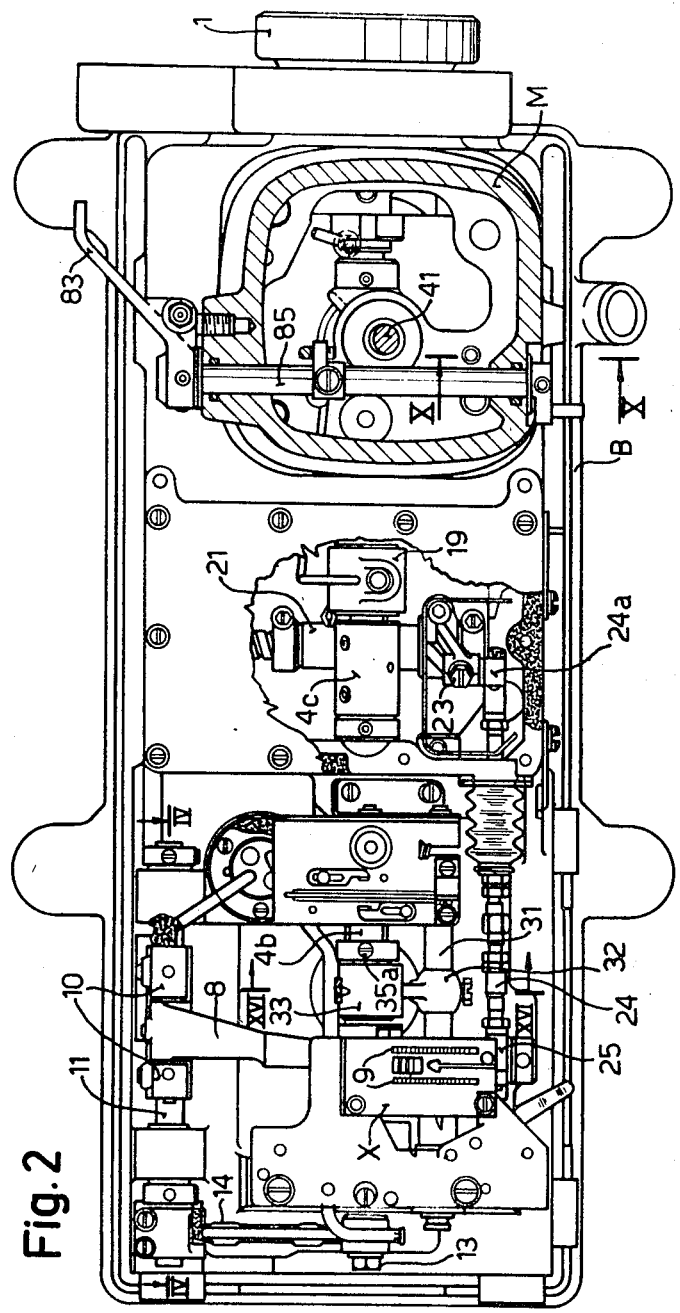

Nov. 26, 1968    N. MARFORIO    3,412,700
AMPLITUDE ADJUSTMENT FOR A ZIG-ZAG SEWING MACHINE
Filed Dec. 29, 1965

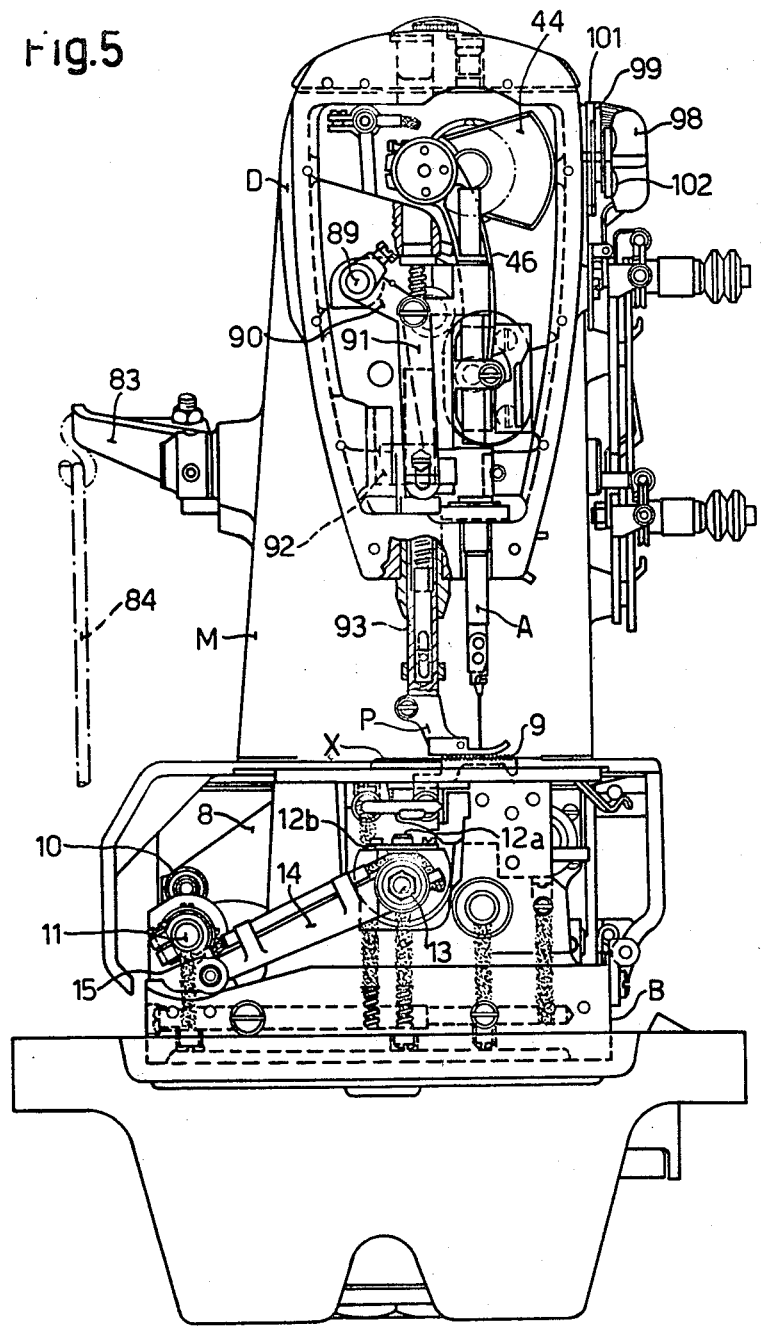

Nov. 26, 1968  N. MARFORIO  3,412,700
AMPLITUDE ADJUSTMENT FOR A ZIG-ZAG SEWING MACHINE
Filed Dec. 29, 1965  14 Sheets-Sheet 7
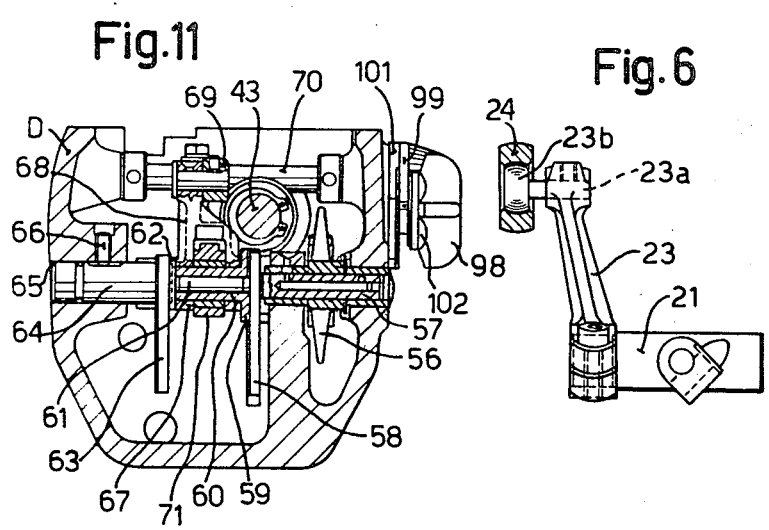
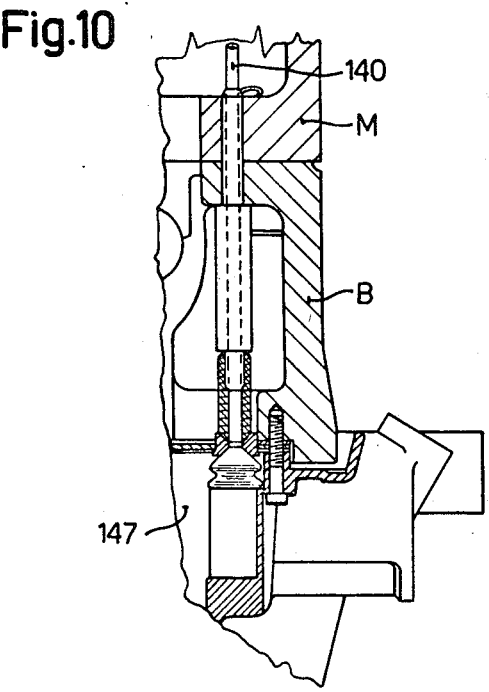

Nov. 26, 1968 N. MARFORIO 3,412,700
AMPLITUDE ADJUSTMENT FOR A ZIG-ZAG SEWING MACHINE
Filed Dec. 29, 1965 14 Sheets-Sheet 9
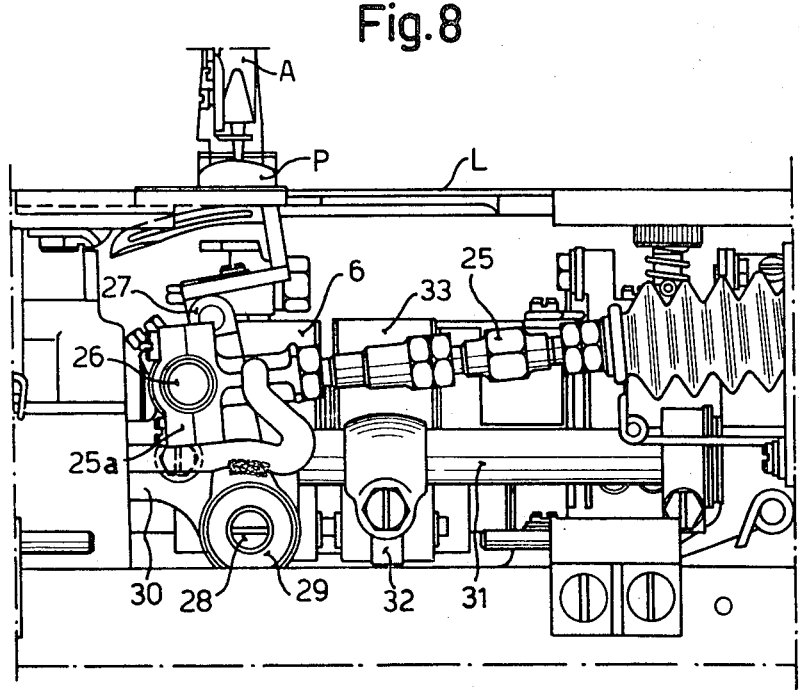
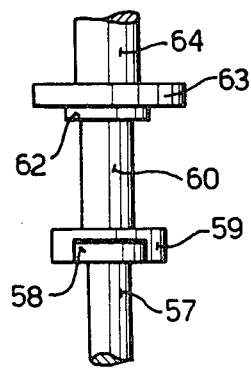
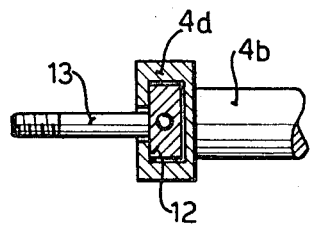

Nov. 26, 1968   N. MARFORIO   3,412,700
AMPLITUDE ADJUSTMENT FOR A ZIG-ZAG SEWING MACHINE
Filed Dec. 29, 1965   14 Sheets-Sheet 13
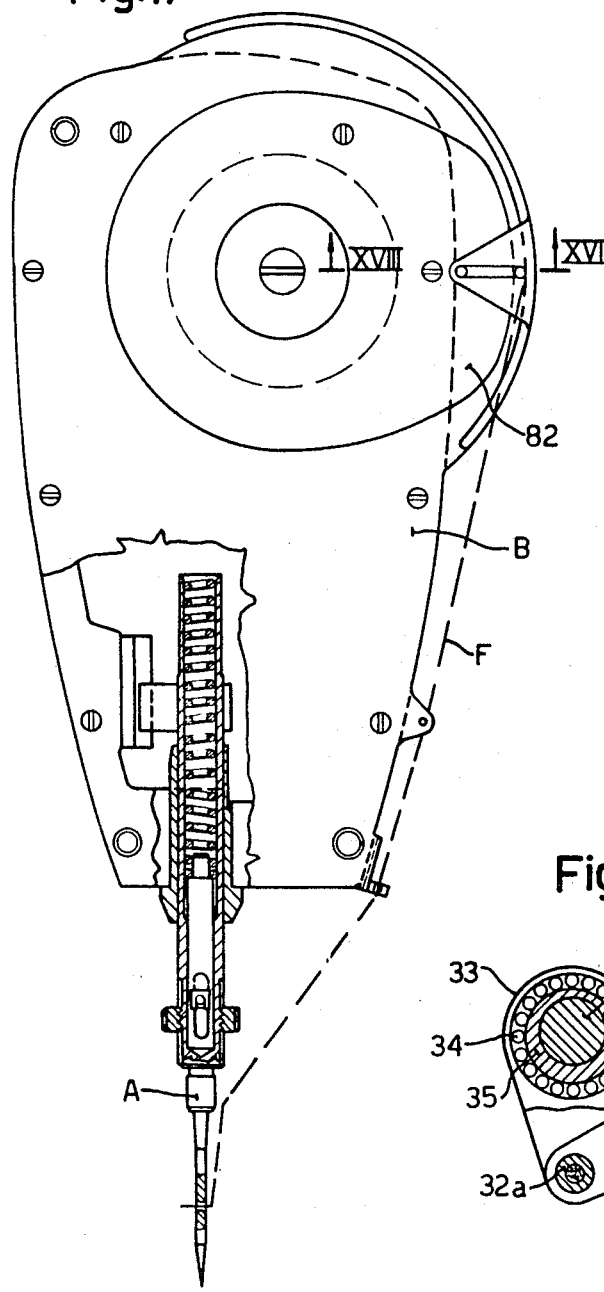
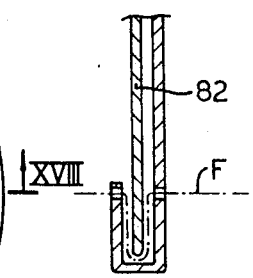
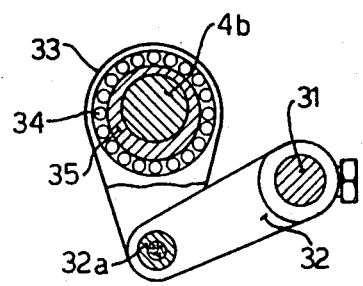

United States Patent Office 3,412,700
Patented Nov. 26, 1968

3,412,700
AMPLITUDE ADJUSTMENT FOR A ZIG-ZAG
SEWING MACHINE
Nerino Marforio, Milan, Italy, assignor to S.p.A.
Virginio Rimoldi & C., Milan, Italy
Filed Dec. 29, 1965, Ser. No. 517,209
Claims priority, application Italy, Nov. 5, 1965, 481/65
1 Claim. (Cl. 112—158)

ABSTRACT OF THE DISCLOSURE

A zig-zag sewing machine having a bed plate with a working table thereon. A standard is disposed between the bed-plate and carries the end of an arm which extends above the bed-plate. A needle bar support is arranged within the free end of the arm for a reciprocating needle bar. A transmission imparts lateral displacements to the needle bar support and comprises a bushing slidable on an oscillating lever and a connecting rod articulated at one end to the bushing and at the other end to the needle bar support. Means are provided for adjusting the width of the lateral displacements the needle bar support comprising a link having a lower forked end articulated to the bushing and a transverse shaft and an arm thereon articulated to the other end of said link. One end of the transverse shaft extends outwardly from the last-mentioned arm and means are provided for adjusting the lateral displacements of the needle bar support secured to the last-mentioned arm.

---

This invention relates to a double chain stitch sewing machine, and concerns more particularly an arm type machine.

Machines of this type adapted to form double chain zig-zag stitches are known. The known machines are objectionable in that, in order to vary the width of the zig-zag seam the machine should be stopped and the necessary adjustments should be made on the mechanisms effecting displacements of the needle bar. The width of the zig-zag seam is understood to mean the spacing of the consecutive stitches, by which the needle is driven through the work, measured in a direction perpendicular to the stitch forming direction.

This entails loss of time and requires skilled work.

According to this invention the above drawback is obviated by providing a double chain stitch sewing machine of the type in which the needle bar is slidably mounted at the free end of a stationary arm extending above the working table, starting from a standard fast with the machine base plate which houses the main operating shaft of the machine, in which the stationary arm has rotatably supported therein a longitudinal shaft transmitting reciprocating movements to the needle bar support, wherein the machine is provided with means driven from said longitudinal shaft for transmitting to the needle bar support a movement in a longitudinal direction of the machine before the formation of each double chain stitch, and a reverse movement after said stitch has been formed, and means for adjusting and continuously varying even during operation of the machine the width of the movement between a predetermined maximum and a nil value corresponding to the formation of a straight seam, the last-mentioned means comprising a rotatable adjusting member situated externally of the machine, the rotation of which effects variation in length of the arm of a swing lever which reciprocates the needle bar support.

Other characteristic features and advantages of this invention will be clearly understood from the appended description referring by way of example to the embodiment shown on the accompanying drawings, wherein:

FIGURES 1a and 1b are the top and bottom parts, respectively, of the longitudinal section of a machine according to this invention;

FIGURE 2 is a part sectional plan view of the machine part shown in FIGURE 1b;

FIGURE 5 is a part sectional front view of the machine according to this invention;

FIGURE 6 is a side elevational view of a constructional detail of the machine;

FIGURE 8 is a side elevational view of a further mechanism of the machine;

FIGURE 9 is a sectional view on line IX—IX of FIGURE 1a;

FIGURE 10 is a sectional view on line X—X of FIGURE 2;

FIGURES 11, 12 and 13 are sectional views on lines XI—XI, XII—XII, XIII—XIII of FIGURE 1a;

FIGURE 14 is a plan view of a constructional detail of the machine which is shown also in the sectional view of FIGURE 11;

FIGURE 15 is a sectional view on line XV—XV of FIGURE 1b;

FIGURE 16 is a sectional view on line XVI—XVI of FIGURE 1b;

FIGURE 17 is a part sectional diagrammatical front view of the forward arm portion, showing the members adapted to stretch the needle thread for forming the stitch;

FIGURE 18 is a sectional view on line XVIII—XVIII of FIGURE 17;

Figure 3:
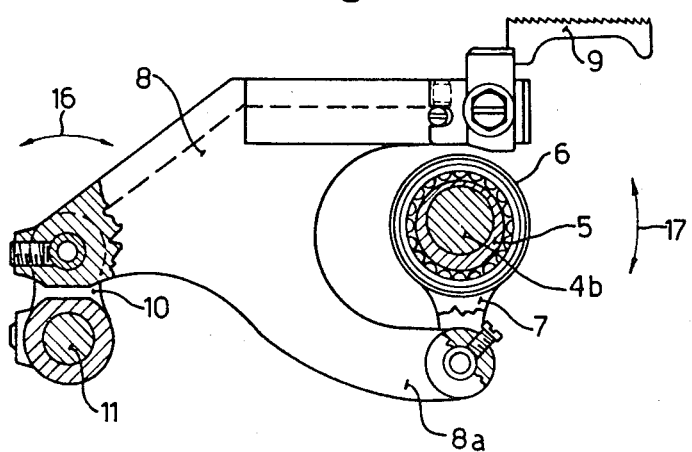
FIGURE 3 is a part sectional front elevational view of a constructional detail of the machine.

The machine shown on the drawings receives motion from a motor (not shown) through a pulley 1 (FIGURE 16) having traveling thereon a belt 2 which also drives the pulley 3 for the oil pump which shall be described hereafter. The pulley 1 is keyed to a portion 4a of the main driving shaft of the machine mounted on the bed plate B of the latter and having a forward portion 4b connected with a portion 4a by a sleeve 4c. At the region of the portion 4b of the main shaft beneath the needle bar A an eccentric 5 is secured which carries through the interposition of a needle bearing a sleeve 6 provided with a bottom fork 7 which is articulated to a projection 8a on the dog-carry member 8 (FIGURE 3). The member 8 adjustably carries in a manner known per se a dog 9 and is further articulated to a link 10 keyed to the oscillating shaft 11 (compare also FIGURES 2, 3, 4 and 5). The portion 4b of the main shaft carries at its forward end opposite the sleeve 4c a head portion 4d (FIGURES 1b and 15) formed with a through radial bore rectangular in cross section which connects with the outside through a notch cut in the front wall of the head portion 4d. The through bore has slidably mounted therein a stud 12 carrying a pivot 13 extending to the outside through said diametrical notch cut in the front wall of the head 4d. The position of the stud 12 as well as of the pivot 13 with respect to the axis of the main driving shaft can be adjusted by means of a screw 12a which is screwed into a cut hole extending parallel with the longitudinal direction of the radial opening through the head portion 4d provided in the stud 12. The screw 12a is formed with a flange (FIGURES 1b and 5) engaging the edges of an opening bore in a plate 12b secured by means of screws to the top of the head portion 4d. This assembly prevents axial displacement of the screw 12a when the latter is rotated in order to vary the position of the stud 12 and its pivot 13.

The pivot 13 has articulated thereto a link 14 (FIGURE 5) the other end of which is articulated to an arm 15 secured to said shaft 11 supporting the forked arm 10 and carrying one end of the dog-carry member 8. With the above described mechanism, the dog-carry member 8 can be moved horizontally as denoted in FIGURE 3 by an arrow 16, and at the same time vertically as denoted in the same FIGURE 3 by another arrow 17. The combination of the above described movements represents the movement of the dog 9 required for feeding the work during sewing.

The portion 4a of the main shaft has keyed thereto near the sleeve 4c an eccentric 18 having mounted thereon an oscillating link 19. The latter further engages a spherical head 20a on an arm 20 secured to a support 21 mounted for rotation on a stationary pivot 22.

Figure 7:
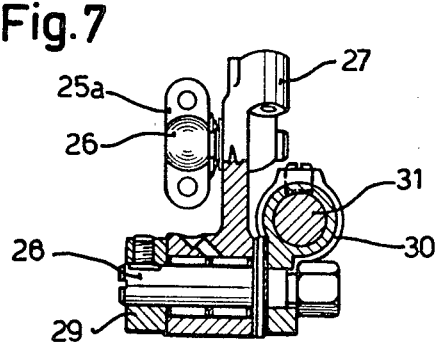
FIGURE 7 is a part sectional view of a further constructional detail of the machine.

The sleeve 21 has secured thereto an arm 23 carrying at its end (FIGURE 6) a pivot 23a securely fixed to a spherical head 23b having fitted thereon an end 24 of a link 25 (FIGURE 8) extending longitudinally of the machine. The other end 25a of the link 25 engages (FIGURES 7 and 8) the spherical head 26 secured to the loop-holder 27 rotatably mounted on a pivot 28 (FIGURE 7) which is in turn carried by a support 30 secured to the shaft 31 extending longitudinally of the machine.

The shaft 31 (FIGURE 16) has further keyed thereto an arm 32, the end of which is mounted on a pivot 32a carried by a fork fast with a sleeve 33 mounted for rotation through the interposition of a ball or roller bearing 34 on an eccentric 35 secured by means of a screw 35a (FIGURE 2) to the portion 4b of the main driving shaft.

Figure 13:
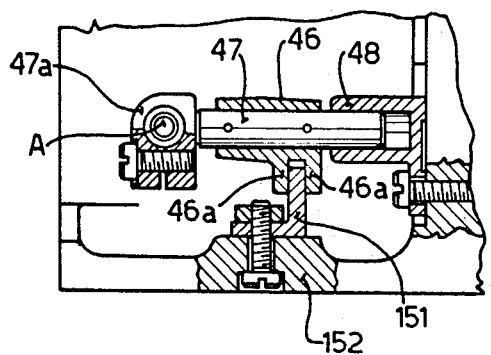

It will be clear from the above that the oscillations performed by the looper in a plane perpendicular to the direction of the seam are derived from the eccentric 18 (FIGURE 1b), the reciprocations of the looper in a direction transversely of its abovementioned oscillations being derived from eccentric 35, so that the looper alternately reaches on either side of the needle during formation of the double chain stitch. The portion 4a (FIGURE 1b) of the main driving shaft has keyed thereon one of the double wheel pair 40 which transmits motion to a vertical shaft 41 situated within the standard M secured to the base plate B and made as one piece with the arm D (FIGURE 1a) the forward or head portion whereof supports the needle bar A. The shaft 41 transmits rotation to a horizontal shaft 43 through a double wheel pair 42. The double wheel pair 40, 42 are so arranged that the shaft 43 rotates in the same direction and at the same speed as the main driving shaft 4a, 4b. A weighted crank 44 is arranged at the end of the shaft 43 remote from the double wheel pair 42 and carries a crank pin 45 provided with a forward extension 45a. The crank pin 45 has articulated thereto a connecting rod 46, the bottom end of which is fitted on a pivot 47 guided in a stationary guideway 48 of U-shape (FIGURE 13), having at its other end an eye 47a in which the needle bar A is firmly held. The needle bar extends downwardly through an opening 49 (FIGURE 1a) bored in the bottom wall of the head portion 50 of the arm D, the opening being closed by a rubber seal 51 of bellows shape.

The shaft 43 has keyed thereon a worm wheel 52 (FIGURE 9) meshing with a toothed wheel 53 keyed on a transverse shaft 54. The latter carries besides the toothed wheel 53 an eccentric 55 (FIGURE 1a) engaged by a fork 56 fast with a transverse shaft 57 parallel with the shaft 54. The shaft 57 carries at its end turned towards the inside of the arm D an arcuated lever 58 (compare also FIGURES 11 and 14) against which a flange portion 59 on a longitudinally bored bushing 60 is pressed on the side remote from the shaft 57.

The face of the portion 59 of the bushing 60 which is turned towards the lever 58 is formed with a through groove matching in shape the lever 58, so that this portion acts as a slide capable of displacement together with the bushing 60 along the arcuated lever 58 (FIGURE 14). A stem 61 of a metal washer 62 (FIGURE 11) adjacent a disc 63 carried by a pivot 64 housed by a guideway 65 formed through the wall of the arm D, the disc being secured in the guideway in any desired position by means of a catch 66.

The bushing 60 is engaged by a forked end 67 of a link 68, the other end of which is articulated to an arm 69 keyed to the transverse shaft 70 (FIGURE 11) extending parallel with the shafts 57 and 54.

The bushing 60 has moreover pivoted thereto the big end portion of a connecting rod 71 articulated at its other end to a sleeve 72 (FIGURE 1a) secured on a shaft 73 extending parallel with the shaft 43 effecting the displacements of the needle bar A. The shaft 73 which is situated at a lower level and on one side of the shaft 43 is slidably mounted in bearings 74, 75. The end of said shaft turned towards the needle bar A has secured thereto a support 76 for the guideways 76a, 76b having slidably mounted therein the needle bar A.

On rotation of the shaft 70 (FIGURES 11 and 1a) the bushing moves along the arcuated lever 58, whereby the axis of the bushing is moved from the position in which it is concentrical with the axis of the shaft 57 to an eccentric position to the axis of the latter. This results during operation of the machine in ceasing of the inoperative condition of the connecting rod 71 and starting of the reciprocations of the latter, whereby reciprocatory linear movements of the shaft 73 in the bearings 74 and 75 are induced. The movements of the shaft 73 effect in turn similar movements of the support 76 and guideways 76a and 76b carrying the needle bar A which is thereby moved in opposite directions parallel to itself.

The peculiarity of the movement which is transmitted to the needle bar A during each full downward and upward cycle of the latter depends upon the shape of the cam 55. The latter is of a configuration such as to sharply distinguish between the periods during which the support 76 for the needle bar A is at a standstill in either end position, and the period in which the needle bar and support therefor are moved longitudinally of the machine. Moreover, the transmission ratio between the gears 52, 53 is one 1:2, so that the shaft 54 is rotated at a speed half the rotational speed of the shaft 43, hence of the main driving shaft 4a, 4b.

The small end of the connecting rod 46 carries a pair of ribs 46a (FIGURE 13) which define the U-shaped channel engaging a vertical L-shaped rib 151 secured to the inner wall of the head portion 152 of the arm. This structure prevents the connecting rod 46 from moving in the direction of the axis of the shaft 43 during forming of the zig-zag seam. The rib 151 picks up any thrust in an axial direction of the shaft 43 which might act upon the connecting rod 46. The extension 45a (FIGURE 1a) of the crank pin 45 on the crank ends by a circular rim 45b having secured thereto a dial 80 acting to center with respect to the crank pin 45 an eccentric disc 81 secured to the rim 45b by means of two screws. The disc 81 has secured thereto by means of a screw a sheet metal disc 82, the axis of which is concentric with the axis of the driving shaft 43. The contour of the disc 82 is of cam shape for governing, that is, stretching and loosening, the needle thread F (FIGURE 17) during the needle's upward and downward movement.

Figure 12:
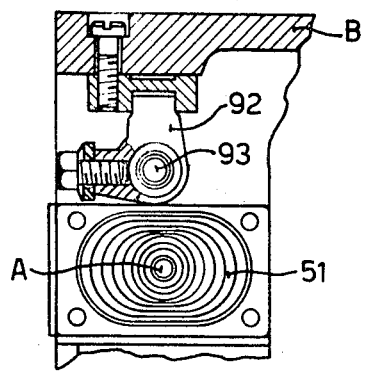

A lever 83 (FIGURES 5 and 9) effects on lowering the lifting of the pressure foot P. The lever 83 has attached thereto a pull-rod 84 connected at the bottom to a pedal (not shown). The lever 83 is keyed to the shaft 85 carrying a short arm 86 (FIGURE 1a) having fastened thereto a further pull-rod 87. The latter acts on a lever 88 (FIGURE 9) keyed to the shaft 89 which extends parallel to the shaft 43. The shaft 89 carries an arm 90 (FIGURE 5) situated at the further end of the machine, having articulated thereto a link 91 fitted at the bottom on a sleeve 92 (compare also FIGURE 12) secured to the bar 93 of the pressure foot. The sleeve 92 is clamped to the bar 93 of the pressure foot F.

Figure 23:
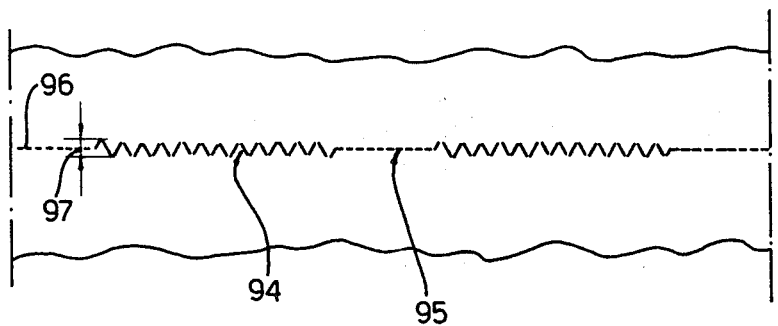
FIGURE 23 is a diagram of the seam which can be effected by the machine according to this invention.
Figure 24:
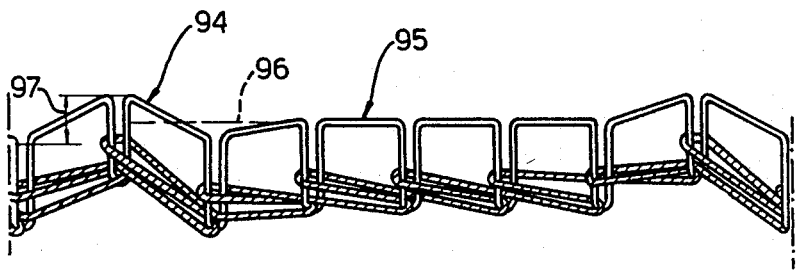
FIGURE 24 is a perspective view of the thread interlacing forming the seam according to FIGURE 23.

The machine according to this invention can be provided with external controls of various kinds for effecting adjustment of the width of the zig-zag seam down to a zero width, that is, to the formation of a straight seam. With said means it is possible in any case to switch over from the formation of a seam (FIGURES 23 and 24) made up of stitches 94 (that is, stitches of the type distinguished by No. 404 of the United States Federal Standard Catalogue) to the formation of a seam made up of stitches 95 (that is, stitches distinguished by No. 401 of the catalogue). The orientation of the stitches 94 with respect to the direction of the middle line 96 of the seam, and the width of the latter, that is, its dimension 97 are varied by rotating the shaft 70.

Figure 25:
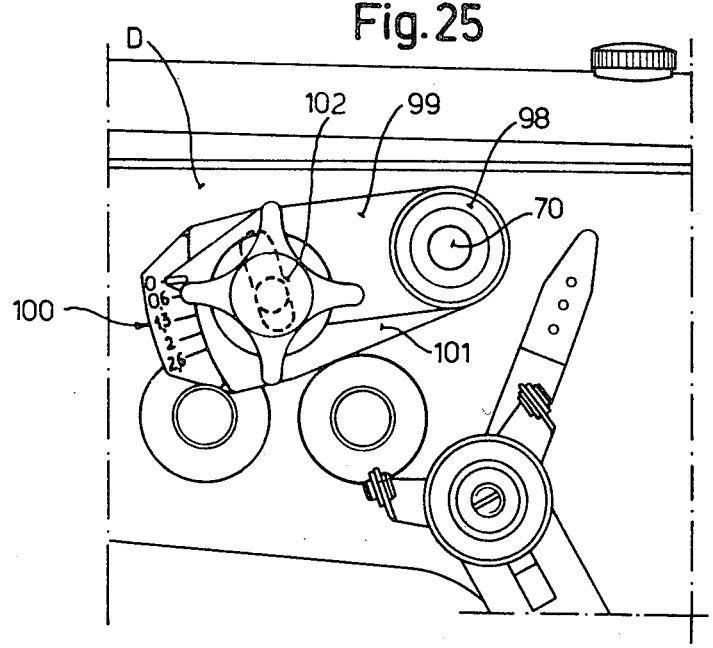
FIGURE 25 is a front view of a further constructional detail of the machine on an enlarged scale.
Figure 9:
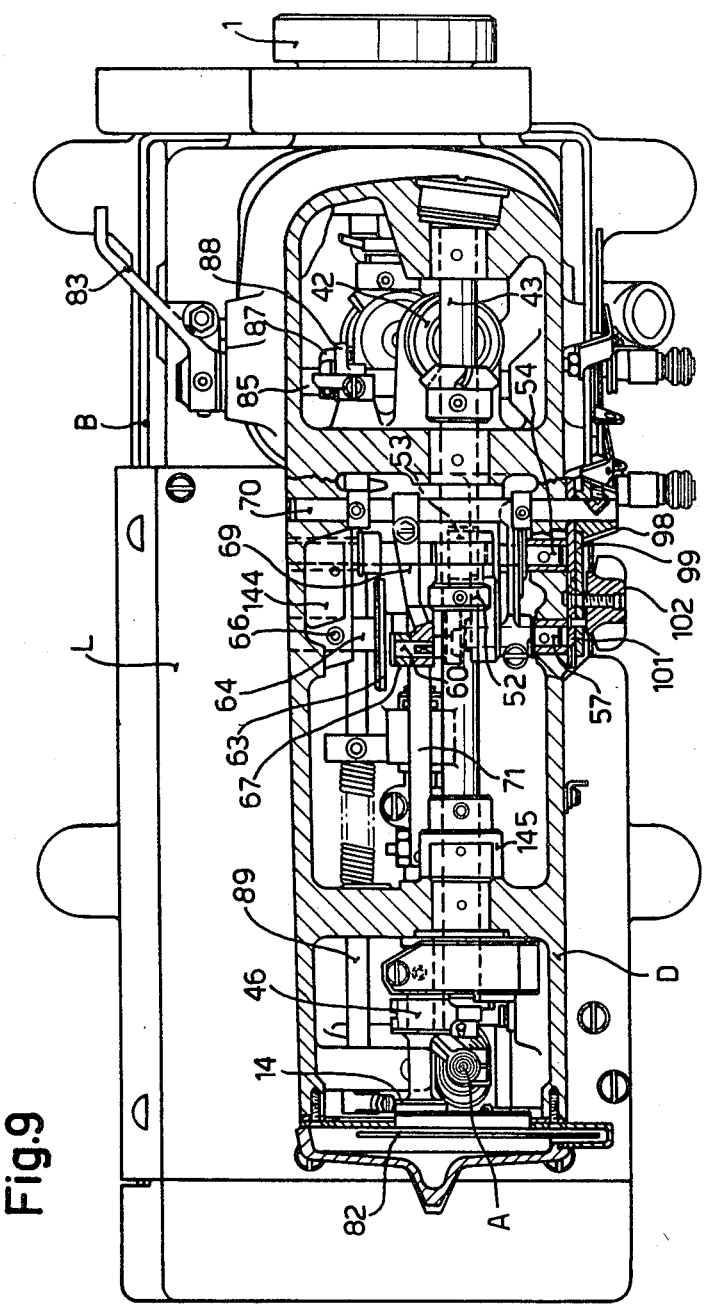

A first of simpler method of adjusting the width of a zig-zag seam is shown in FIGURES 5, 9 and 25. It will be seen from these figures that the end of the shaft 70 extending along the wall of the arm D has screwed thereto a knob 98 having fast therewith a lever 99 in the form of an elongated plate ending by a pointer. The latter cooperates with a scale 100 engraved on a stationary plate 101 fast with the wall of said arm D. The lever 99 together with the knob 98 and shaft 70 can be retained with respect to the stationary plate 101 by screwing the clamping head 102 on a screw-threaded pin carried by the plate 101, extending beyond the lever 99 through an arcuated opening having its center of curvature on the axis of the shaft 70, bored in the lever.

When the point on the lever 99 is against the mark "0" on the scale engraved in the stationary plate 101, the members effecting the displacements of the needle bar A necessary for forming a zig-zag seam are in positions such that the bar merely performs upward and downward movements and the machine forms a straight seam (by points No. 401). On lowering the lever 99 the formation of a zig-zag seam (from points No. 404) is switched on, the seam switch gradually increasing up to a maximum value which is attained when the pointer on the lever 99 is against the lower mark ("2,6") on the scale engraved in the plate 101.

Figure 19:
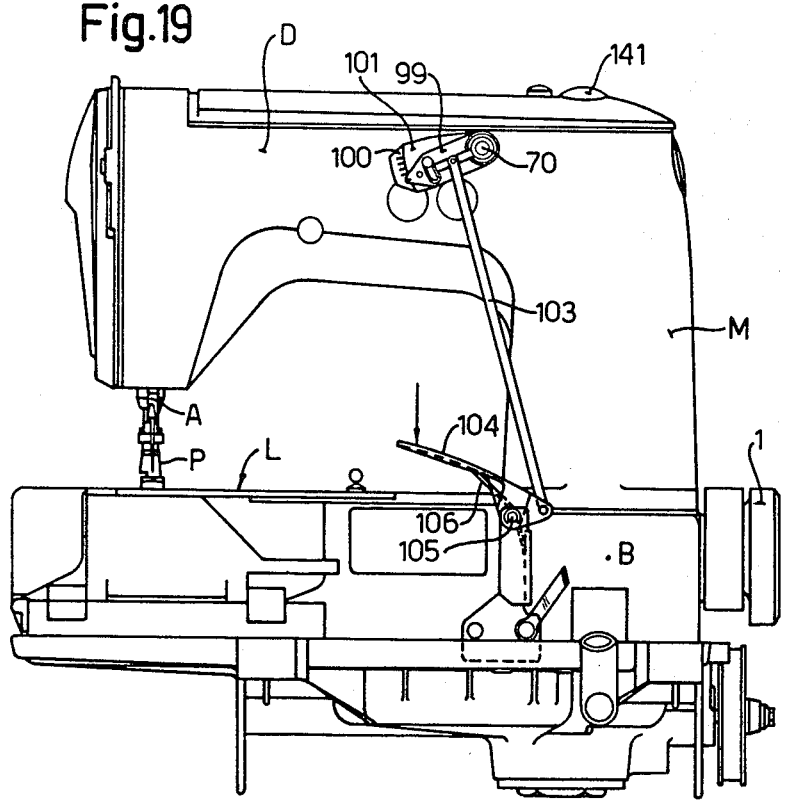
FIGURE 19 is a side elevation view of the machine according to this invention provided with means for effecting variation in width of the zig-zag seam according to a modification.

According to the modification shown in FIGURE 19, the clamping head 102 is omitted, the lever 99 having articulated thereto a rod 103, the bottom end of which is pivoted to an operating lever 104 arranged in proximity to the working table L, at the root of the standard M extending beyond the bed plate B. The lever 104 is rotatably mounted about an axis 105 carried by the bed plate B and is biased upwardly by a torque spring 106. Consequently, the lever 99 is normally held in a position corresponding to the formation of a zig-zag seam of the largest permissible width. Whereas on depressing the lever 104 the width of the zig-zag seam may be either gradually or instantaneously reduced down to its zero value, the machine then forming a straight seam.

Figure 20:
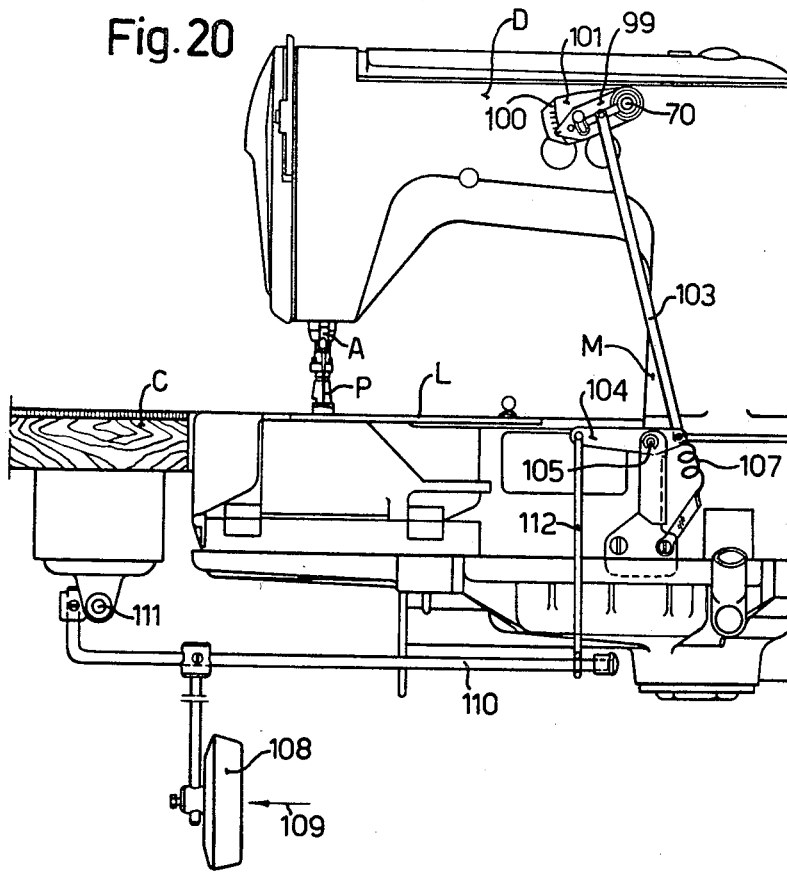
FIGURE 20 is a side elevation view of the machine according to the invention provided with means for effecting variation in width of the zig-zag seam according to a further modification.

According to the modification shown in FIGURE 20, the lever 99 is held lowered by the action of the spring 107 and is lifted when the attendant pushes by her knee a plate 108 in the direction denoted by the arrow 109. Pressure on the plate 108 rotates, downwardly, the lever 110 about the point 111 situated beneath the bed C supporting the machine. This results in lowering, through the pull-rod 112, of the lever 104 against the action of the spring 107 and an upward movement of the lever 99 under the action of the rod 103.

Figure 22:
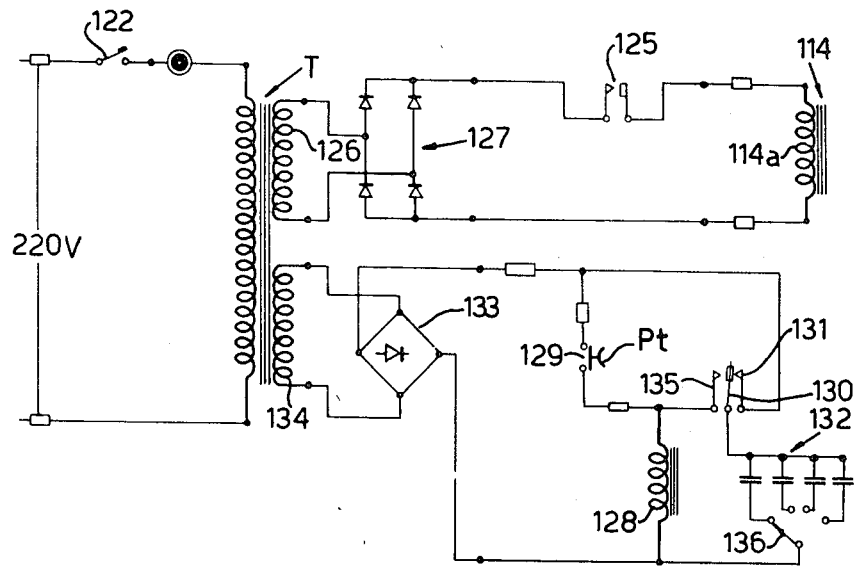
FIGURE 22 is the wiring diagram of one of the devices equipping the embodiment according to FIGURE 21.
Figure 4:
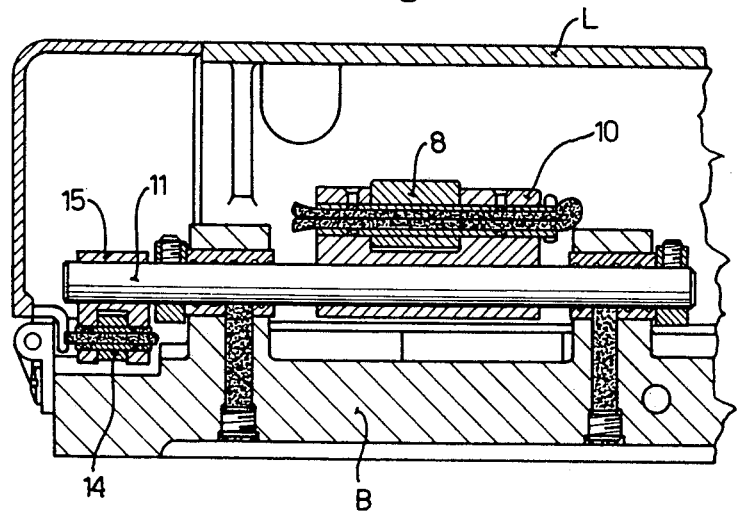
FIGURE 4 is a sectional view on line IV—IV of FIGURE 2.
Figure 21:
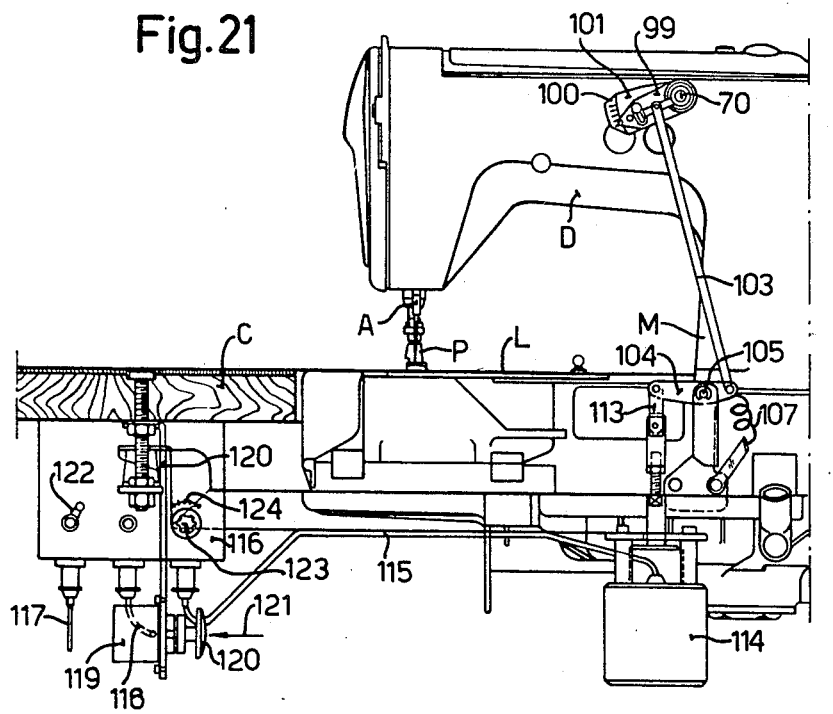
FIGURE 21 is a side elevation view of the machine according to this invention provided with means for effecting variation in width of the zig-zag seam according to another modification.

According to another modification shown in FIGURES 21 and 22, the lever 104 is connected through a link 113 to the movable core of an electromagnet 114. The latter is energised when its winding is fed with electric current through a cable 115 from an adjusting and timing device arranged within a casing 116 secured beneath the machine bed C. The casing 116 is connected with the net-work supplying electric current through a cable 117 and to a switch in a housing 119 through a cable 118, the housing 119 is secured to the bed C by means of a strap 120. The switch in the housing 119 may be closed by pushing, by the knee in the direction of the arrow 121, a plate Pt carried by the housing 119. A main switch 122 and a rotatable knob 123 are arranged in the front wall of the casing 116, the knob 123 cooperating with a scale 124 the purpose of which shall be explained hereafter.

The winding 114a (FIGURE 22) of the electromagnet 114 is connected on closure of the switch 125 in the casing chamber 116, the switch being normally open, with the secondary winding 126 of the transformer T through a rectifier 127. The switch 125 can be closed on energization of the winding 128. For this to take place the switch 129 should first of all be closed by pushing by a knee the plate Pt (FIGURE 21). Energization of the winding 128 results in switching over of the movable contact 130 from its position shown in FIGURE 22—in which it contacts the stationary contact 131 permitting connection of the capacitors 132 to one pole of the rectifier 133 fed from the secondary winding 134 of the transformer T—to a position in which said movable contact 130 contacts the stationary contact 135. The latter is connected with the end of the winding 128 which may in turn be connected through a switch 129 to a rectifier 133. Out of the condensers differing capacitance, one only may be connected with the other pole of the rectifier 133 by means of a movable contact 136 fast with the knob 123 (FIGURE 21) cooperating with a scale 124 engraved in the front wall of the casing chamber 116. On closure of the switch 129 the capacitor which is connected with both poles of the rectifier 133, feeds the winding 128 which keeps energised—though no pressure is any longer exerted on the plate Pt and, consequently, the switch 129 opens—during a period proportional to the capacitance of the capacitor which had charged during the period when the movable contact 130 was connected with the stationary contact 131.

By rotating the knob 123 the movable contact 136 may be displaced to activate another capacitor 132, differing in capacitance. A different period of energization of the winding 128 can thereby be set, at the same time as the period during which the switch 125 keeps closed and the electromagnet 114 operates. Since the latter is capable of lowering the lever 104, it can effect displacement of the latter from its position shown in FIGURE 21 to its lower position, which results in switching over from the formation of a zig-zag seam of maximum width to the formation of a straight seam.

Of course, by adjusting the starting position of the lever 104 by acting on the screws interposed in the linkage connecting it to the core of the electromagnet 114, a zig-zag seam of a width lower than the maximum one can be effected. By holding the plate Pt pressed straight seams can be formed during desired periods of time which are not bound to the capacitance of the capacitors 132.

The pump Z (FIGURE 1b) acting to lubricate the components of the machine comprises two adjacent gear sets (not shown). The gear set arranged nearer the pulley 3 draws oil from the sump 137 through a conduit 138 and conveys it through a conduit 139 to a vertical tube 140 which sprays oil against the inner wall of the dome 141 (compare FIGURE 1a) of the material known by the trade name Plexiglas, from which oil falls in a shower on all moving parts.

A "spoon" 142 is arranged beneath the Plexiglas dome 141 and connects with a metal tube 143 which pours oil by drops into a reservoir 144 (FIGURE 9) formed in the inner face of the right hand wall of the arm B. Tubes of plastic material extend from the reservoir 144 and have arranged therein wicks for greasing the machine components situated in the forward portion of the arm B, inclusive of the connecting rod 46 which effects movement of the needle bar A and bushing 145 (FIGURE 1a) carrying the top main shaft 43.

Any oil dispersed by the capillary lubricating means at the region of the needle bar is drawn through a tube 146 of plastics (FIGURES 1a and 1b) connected with the stage of the pump formed by the gears (not shown) wider apart from the pulley 3. The oil is discharged through an orifice in the pump casing to the oil reservoir 147.

The driven parts of the main shaft 4a, situated beneath the working table L in the bed plate B of the machine, are greased by the oil shower falling from below the dome 141 of Plexiglas. The oil collecting in the space 148 above the pump reaches the bottom reservoir 147 through a skimmer 149 situated near the shaft 22. The mechanisms arranged beneath the needle plate X are greased by capillarity by means of wicks. Reflux towards the bottom tank 147 is effected through the bottom felt web 4 and hole 150 (FIGURE 1b).

What I claim is:

1. A zig-zag sewing machine comprising, a bedplate and a working table thereon, a machine arm extending above said table and a standard interposed between said bedplate and one end of said machine arm thereby carrying the arm, a reciprocating needle bar, a needle bar support arranged within the free end of said machine arm and a transmission imparting lateral displacements to said needle bar support; said transmission comprising an oscillating lever, a shaft fixed to the needle bar support, a bushing slidable on said oscillating lever and a connecting rod articulated at one end to said bushing and at the other end thereof a sleeve secured on said shaft fixed to the needle bar support; means for adjusting the width of the lateral displacements of said needle bar support comprising a link having a lower forked end articulated to said bushing, a transverse shaft and an arm thereon having articulated thereto the other end of said link, said transverse shaft having one end extending externally from the machine arm, a lever fixed to said end extending externally from the machine arm, said lever having the shape of an elongated plate, ending as a pointer and a stationary scale fixed to the machine arm and cooperating with said pointer, means for locking said elongated plate in desired position with respect to said scale comprising a control lever rotatable about a horizontal axis supported by the bedplate and arranged at the level of the working table of the machine, a rod having its upper end articulated to said elongated plate and its lower end to said control lever, and a spring biasing said control lever to a position corresponding to a position for forming a zig-zag; an electromagnet having a movable core, a link connecting the movable core of the electromagnet to said control lever and a control means for energizing said electromagnet; said control means comprising a circuit energizing said electromagnet, a normally open switch for rendering operative said circuit and means for adjusting the period of energization of the electromagnet after the closure of said switch, a knee pad connected with said switch arranged beneath the machine bed at such a position that it can be easily pressed by a movement of the attendant's knee in order to close said switch.

References Cited

UNITED STATES PATENTS

| | | | |
|---|---|---|---|
| 2,645,195 | 7/1953 | Zucker | 112—158 |
| 2,882,847 | 4/1959 | Winz | 112—219 |
| 2,887,967 | 5/1959 | Kasper et al. | 112—158 |
| 2,757,626 | 8/1956 | Fujita | 112—158 |
| 2,895,441 | 7/1959 | Engel et al. | 112—248 |
| 2,977,910 | 4/1961 | Covert | 112—256 |
| 3,313,258 | 4/1967 | Wulbrede et al. | 112—158 |

RICHARD J. SCANLAN, JR., *Primary Examiner.*

UNITED STATES PATENT OFFICE
CERTIFICATE OF CORRECTION

Patent No. 3,412,700                        November 26, 1968

Nerino Marforio

It is certified that error appears in the above identified patent and that said Letters Patent are hereby corrected as shown below:

In the heading to the printed specification, line 7, "Nov. 5, 1965" should read -- Jan. 5, 1965 --.

Signed and sealed this 21st day of April 1970.

(SEAL)
Attest:

Edward M. Fletcher, Jr.                    WILLIAM E. SCHUYLER, JR.
Attesting Officer                            Commissioner of Patents